(12) United States Patent
Yang et al.

(10) Patent No.: US 9,606,600 B2
(45) Date of Patent: Mar. 28, 2017

(54) FILE STORAGE STATE MANAGEMENT, BATTERY CAPACITY MANAGEMENT, AND FILE REPRODUCTION MANAGEMENT FOR CLIENT DEVICES

(75) Inventors: Gyung Hye Yang, Seoul (KR); Sang Woong Hwang, Seongnam-si (KR); Eun Young Lim, Seoul (KR); Ji Young Kwahk, Seongnam-si (KR); Bong Hyun Cho, Gwangju-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 284 days.

(21) Appl. No.: 12/554,493

(22) Filed: Sep. 4, 2009

(65) Prior Publication Data

US 2010/0077337 A1    Mar. 25, 2010

(30) Foreign Application Priority Data

Sep. 24, 2008  (KR) .................. 10-2008-0093727

(51) Int. Cl.
*G06F 3/0484* (2013.01)
*G06F 1/26* (2006.01)
(Continued)

(52) U.S. Cl.
CPC ........ *G06F 1/266* (2013.01); *G06F 17/30126* (2013.01); *G11B 27/105* (2013.01);
(Continued)

(58) Field of Classification Search
CPC ......... G06F 17/30011; G06F 17/30126; G06F 3/0601; G06F 2206/1008; H04L 29/08954; H04L 29/0899; H04L 41/22; H04J 7/0027
(Continued)

(56) References Cited

U.S. PATENT DOCUMENTS 5,057,762 A * 10/1991 Goedken et al. ............. 320/116
5,319,571 A *  6/1994 Langer ...................... G06F 1/26
                                                       713/300
(Continued)

FOREIGN PATENT DOCUMENTS

JP        2007-072813        3/2007
KR      10-2005-0039553      4/2005
KR      10-2005-0039560      4/2005

OTHER PUBLICATIONS

Gookin, Dan, "PCs for Dummies," Sep. 24, 2007, John Wiley & Sons, 11th Edition, pp. 243-249, 285-288, 297-316.*
(Continued)

*Primary Examiner* — Alvin Tan
(74) *Attorney, Agent, or Firm* — H.C. Park & Associates, PLC

(57) ABSTRACT

An electronic device managing method and system, and a host electronic device using the method are disclosed. A plurality of client electronic devices may be connected to the host electronic device. The host electronic device may perform file storage state management, remaining battery capacity management, and file reproduction management, thereby integrally and efficiently managing the plurality of client electronic devices. The file storage state management may include managing file storage states corresponding to the memories of the plurality of client electronic devices, respectively. The remaining battery capacity management may include managing the remaining capacity of the batteries of the plurality of client electronic devices. The file reproduction management may include reproducing at least one of the files stored in the plurality of client electronic devices.

19 Claims, 7 Drawing Sheets

(51) Int. Cl.
*G06F 17/30* (2006.01)
*G11B 27/10* (2006.01)
*G11B 27/32* (2006.01)
*G06F 3/06* (2006.01)

(52) U.S. Cl.
CPC .......... *G11B 27/322* (2013.01); *G06F 3/0601* (2013.01); *G06F 2003/0697* (2013.01); *G06F 2206/1008* (2013.01)

(58) Field of Classification Search
USPC ........................................................ 715/771
See application file for complete search history.

(56) References Cited

U.S. PATENT DOCUMENTS

| | | | |
|---|---|---|---|
| 5,528,735 A * | 6/1996 | Strasnick et al. ............. 345/427 |
| 5,532,939 A * | 7/1996 | Psinakis ................. H04L 12/26 370/238 |
| 5,539,297 A * | 7/1996 | Fiebig ........................... 320/126 |
| 5,870,685 A * | 2/1999 | Flynn ........................... 455/573 |
| 5,878,218 A * | 3/1999 | Maddalozzo et al. ........ 709/213 |
| 5,987,469 A | 11/1999 | Lewis et al. |
| 6,366,792 B1 * | 4/2002 | Katsuki ......................... 455/572 |
| 6,771,044 B1 * | 8/2004 | Vinciguerra et al. ......... 320/116 |
| 7,430,679 B2 * | 9/2008 | Tevanian, Jr. ................. 713/324 |
| 7,911,465 B2 * | 3/2011 | Rhodes et al. ................ 345/440 |
| 8,179,102 B2 * | 5/2012 | Alberth et al. ............... 320/162 |
| 8,301,918 B2 * | 10/2012 | Diab et al. .................... 713/300 |
| 8,422,988 B1 * | 4/2013 | Keshav .................. H04L 12/10 455/405 |
| 2005/0091289 A1 | 4/2005 | Shappell et al. |
| 2005/0091595 A1 | 4/2005 | Shappell et al. |
| 2005/0174091 A1 * | 8/2005 | Dayan et al. ................. 320/128 |
| 2006/0010380 A1 * | 1/2006 | Matsuzawa et al. ......... 715/700 |
| 2007/0055715 A1 | 3/2007 | Achiwa |
| 2007/0291661 A1 * | 12/2007 | Nishibayashi et al. ....... 370/252 |
| 2008/0307317 A1 | 12/2008 | Yohai-Giochais |
| 2009/0030971 A1 | 1/2009 | Trivedi et al. |
| 2009/0140986 A1 | 6/2009 | Karkkainen et al. |
| 2009/0276701 A1 | 11/2009 | Nurmi |
| 2009/0284071 A1 * | 11/2009 | Mitsuoka et al. .............. 307/19 |
| 2010/0281287 A1 * | 11/2010 | Doerksen et al. ............. 713/340 |

OTHER PUBLICATIONS

U.S. Appl. No. 60/879,571, filed Jan. 10, 2007.*
Non-Final Office Action issued on May 2, 2013 in U.S. Appl. No. 12/728,505.
LanSchool Technologies, LLC, LanSchool V7.0, 1-24 (1996-2007).
Final Office Action mailed on Jun. 1, 2015, in U.S. Appl. No. 12/728,505.
Decision of Patent dated Dec. 29, 2014, in Korean Patent Application 10-2008-0093727.
Non-Final Office Action dated Apr. 22, 2016, in U.S. Appl. No. 12/728,505.
Final Office Action dated Oct. 6, 2016, in U.S. Appl. No. 12/728,505.

* cited by examiner

FILE STORAGE STATE MANAGEMENT, BATTERY CAPACITY MANAGEMENT, AND FILE REPRODUCTION MANAGEMENT FOR CLIENT DEVICES

CROSS REFERENCE TO RELATED APPLICATION

This application claims priority from and the benefit of Korean Patent Application No. 10-2008-0093727, filed on Sep. 24, 2008, which is hereby incorporated by reference for all purposes as if fully set forth herein.

BACKGROUND OF THE INVENTION

Field of the Invention

Exemplary embodiments of the present invention relate to electronic devices. In particular, exemplary embodiments of the present invention relate to a method for integrally managing a file storage state, a remaining battery state, and a file reproduction state of a client electronic device, and to an electronic device system and a host electronic device using the method.

Description of the Background

In recent years, portable terminals have become widely used, in part, because they can easily be carried. For example, 85% of people in the Republic of Korea are using the mobile communication terminals of portable terminals partially because users may make a voice call while they are moving. Such conventional mobile communication terminals may provide a variety of functions in addition to communicating voice call information between a caller and a called party. The conventional portable terminal may have a file playback function (e.g., MP3 player), and an image collecting function (e.g., digital camera). The conventional portable terminal can also support a function for playing games, such as, for example, a mobile game or an arcade game.

Conventional portable terminals have been developed to provide a variety of functions; however portable terminal batteries have not improved in terms of their capacity. Consumers tend to purchase a variety of electronic devices, such as an MP3 player, a digital camera, and/or a play station portable (PSP), to enjoy their specialized functions (e.g., media file reproduction, video image collection, games), which are provided by the corresponding electronic devices described above, rather than to purchase a single portable terminal. Accordingly, electronic device users may individually and directly manage the respective electronic devices in such a way that they can determine which electronic device stores what type of information and, for example, whether an electronic device needs battery recharging. However, this process may lead to confusion for electronic device users. Furthermore, electronic device users must correctly memorize which electronic devices store which type of files, respectively. For example, if an electronic device user does not memorize the features of a particular electronic device, which stores a specific file to be reproduced, he/she may need to check all the electronic devices, individually.

SUMMARY OF THE INVENTION

Exemplary embodiments of the present invention provide a method for integrally operating and managing at least one electronic device. Exemplary embodiments of the present invention also provide an electronic device management system and a host electronic device using the method.

Additional features of the invention will be set forth in the description which follows, and in part will be apparent from the description, or may be learned by practice of the invention.

Exemplary embodiments of the present invention disclose an electronic device managing method. The method includes receiving at least one of information regarding a file storage state, information regarding remaining battery capacity, and information regarding a list of files from a first client electronic device connected to a host electronic device. The method further includes displaying, on a display unit of the host electronic device, the received information as a graphic user interface object corresponding to the received information.

Exemplary embodiments of the present invention disclose an electronic device managing method. The method includes receiving information regarding remaining battery capacity from at least one client electronic device connected to a host electronic device, and displaying, on a display unit of the host electronic device, the received information regarding the remaining battery capacity. The method further includes determining, from the information regarding the remaining battery capacity, if the remaining battery capacity of the at least one client electronic device is sufficient, and recharging, using a power supply of the host electronic device, a battery of the at least one client electronic device, according to a set condition.

Exemplary embodiments of the present invention also disclose an electronic device managing method. The method includes receiving a list of files from at least one client electronic device connected to a host electronic device, and receiving, via an input unit of the host electronic device, an input signal for searching a file. The method further includes determining whether a first client electronic device, of the at least one client electronic device, storing the file can reproduce the file, and instructing the first client electronic device storing the file to reproduce the file.

Exemplary embodiments of the present invention disclose an electronic device managing system including at least one client electronic device and a host electronic device. The host electronic device includes a connecting interface, a display unit, a power supply, and a controller. The host electronic device is connected to the at least one client electronic device and performs at least one of remaining battery capacity management, file storage state management, and file reproduction management of the at least one client electronic device. The connecting interface connects to the at least one client electronic device. The display unit displays at least one of information related to a remaining battery capacity, information related to a file storage state, and information related to a file reproduction. The power supply recharges and supplies electric power to at least one battery of the at least one client electronic device. The controller controls at least one of the remaining battery capacity management, file storage state management, and file reproduction management of the at least one client electronic device. The remaining battery capacity management includes determining the remaining battery capacity of the at least one client electronic device and determining a battery recharge order of priority according to the determined remaining battery capacity. The file storage state management includes displaying, on the display unit, a file storage state of the at least one client electronic device, and moving, copying, and/or deleting files, stored in the at least one client electronic device, according to a storage input signal. The file reproduction management includes searching for a file, according to a search signal input to an input unit, and, if one of the at least one client electronic device includes the searched file, reproducing the searched file in the one of the at least one client electronic device, according to a set condition.

Exemplary embodiments of the present invention also disclose a host electronic device including a connecting interface, a display unit, and a controller. The connecting interface receives at least one of information regarding file storage state, information regarding remaining battery capacity, and information regarding a list of files from at least one client electronic device connected to the host electronic device. The display unit displays the received information as a graphic user interface object. The controller controls reception and display of the received information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF ILLUSTRATED EMBODIMENTS

Figure 1:
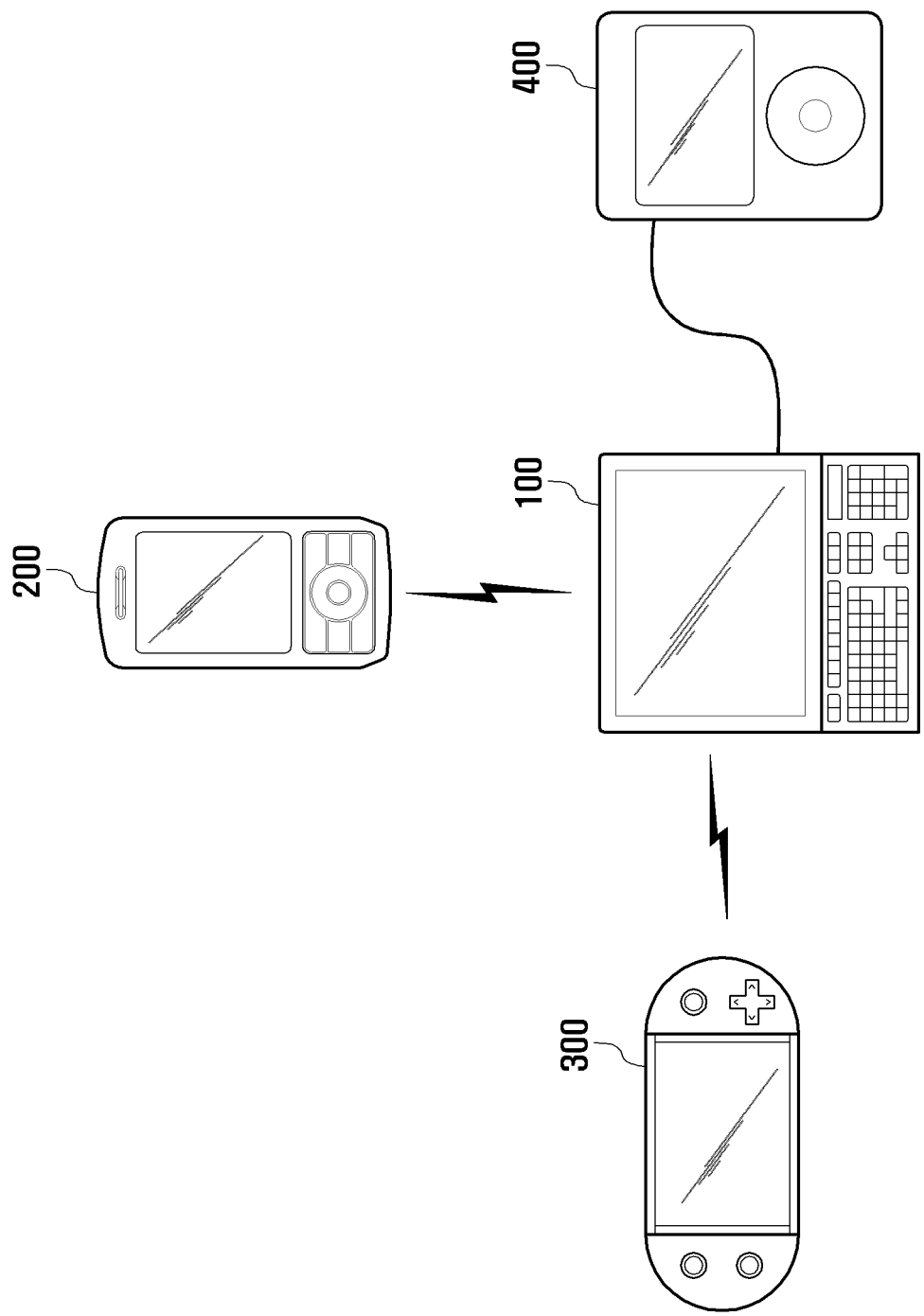
FIG. 1 is a schematic view illustrating an integrated management system according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Although exemplary embodiments of the present invention are described with reference to electronic devices, such as, for example, a mobile communication terminal, an MP3 player, and a PSP, it should be understood that exemplary embodiments of the present invention are not limited to these electronic devices and exemplary embodiments. Accordingly, it can be appreciated that the first to third electronic devices may be implemented with a variety of terminals, such as mobile communication terminals, personal digital assistants (PDAs), Wibro terminals, and/or portable multimedia players (PMPs).

Hereinafter, exemplary embodiments of the present invention are described in detail with reference to the accompanying drawings.

FIG. 1 is a schematic view illustrating an integrated management system according to exemplary embodiments of the present invention.

Referring to FIG. 1, the electronic device management system includes a plurality of client electronic devices 200, 300, and 400, and a host electronic device 100.

The plurality of client electronic devices 200, 300, and 400 may be implemented with a variety of terminals, such as, for example, a mobile communication terminal, a file reproducing terminal, a PSP terminal, or an electronic dictionary. An example of the file reproducing terminal is an MP3 player. The plurality of client electronic devices 200, 300, and 400 may have an interface connectable to the host electronic device 100. The plurality of client electronic devices 200, 300, and 400 may store various files, such as music files, movie files, photograph files, and document files, which, in some cases, may not be duplicated, and, in some cases, may be partially duplicated. For example, a first client electronic device 200 may store first to third music files, and a first movie file; a second client electronic device 300 may store fourth to sixth music files, and a second movie file; and a third client electronic device 400 may store the first, second, and fifth music files. The plurality of client electronic devices 200, 300, and 400 can manage the respective files in a list. Therefore, if a client electronic device is connected to the host electronic device 100, the client electronic device can transmit a corresponding list of files to the host electronic device 100. The plurality of client electronic devices 200, 300, and 400 can provide information related to a file storage state to the host electronic device 100 to manage the stored files. If the plurality of client electronic devices 200, 300, and 400 are connected to the host electronic device 100, the client electronic devices 200, 300, and 400 can recharge their batteries by receiving electric power supplied the host electronic device 100. The client electronic devices 200, 300, and 400 can determine the battery recharging order according to the electronic device use history information, or a state of the battery. For example, the host electronic device 100 may recharge the battery of one of the batteries of the plurality of electronic devices 200, 300, and 400 that has the lowest remaining battery capacity. The host electronic device 100 can also determine the recharge order of priority according to the use frequency of the plurality of electronic devices 200, 300, and 400.

Accordingly, the plurality of electronic devices 200, 300, and 400 can share and manage a file storage state, recharge batteries, and perform a corresponding operation based on use history information via the host electronic device 100. Examples of corresponding operations, include but are not limited to, managing file reproduction.

The connecting interfaces of the plurality of electronic devices 200, 300, and 400 can be implemented in various ways. For example, the first client electronic device 200 may have a universal serial bus (USB) cable as a connecting interface; the second client electronic device 300 may have a short-range wireless communication module based connecting interface; and the third client electronic device 400 may have a universal asynchronous receiver transmitter (UART) cable. In some cases, the connecting interfaces may connect the host electronic device 100 to one of the plurality of electronic devices 200, 300, and 400. In some cases, the connecting interface may connect one of the plurality of electronic devices 200, 300, and 400 to another one of the plurality of electronic devices 200, 300, and 400. Each electronic device 200, 300, or 400 may have one or more connecting interfaces.

The host electronic device 100 has interfaces through which the plurality of client electronic devices 200, 300, and 400 are connected, so that it can receive information regarding file storage states and information regarding battery states from the respective client electronic devices 200, 300, and 400. The host electronic device 100 can temporarily store and/or display, on its display unit, the information regarding file storage states received from the plurality of client electronic devices 200, 300, and 400. The host electronic device 100 may alter or modify the file storage states according to a user's touch events. The host electronic device 100 can receive information regarding battery states from the client electronic devices 200, 300, and 400 to check the remaining battery capacities of the respective client electronic devices 200, 300, and 400, and can perform battery recharge with respect to a corresponding client electronic device according to a preset order of priority.

The host electronic device 100 may receive lists of files stored in the client electronic devices 200, 300, and 400, and may allow a corresponding client electronic device to reproduce a corresponding file according to a user's touch event. The host electronic device 100 may then store use history information indicating which file was reproduced in a client electronic device.

The host electronic device 100 can have a variety of connecting interfaces to which the plurality of client electronic devices 200, 300, and 400 are connected. The host electronic device 100 may be implemented using a variety of electronic devices, such as a television, a large format display (LFD), or a table top. For example, the television may be configured to have interfaces that can be connected to client electronic devices 200, 300, and 400. The LFD may be vertically installed and may have interfaces that can be connected to client electronic devices 200, 300, and 400. The table top may be horizontally installed and may have interfaces that can be connected to client electronic devices 200, 300, and 400. It should be understood that the host electronic device 100 can also be implemented with a PDA, a tablet PC, or a desktop computer.

In the following description, the configuration of the host electronic device 100 is explained in detail with reference to FIG. 2 according to exemplary embodiments of the present invention.

Figure 2:
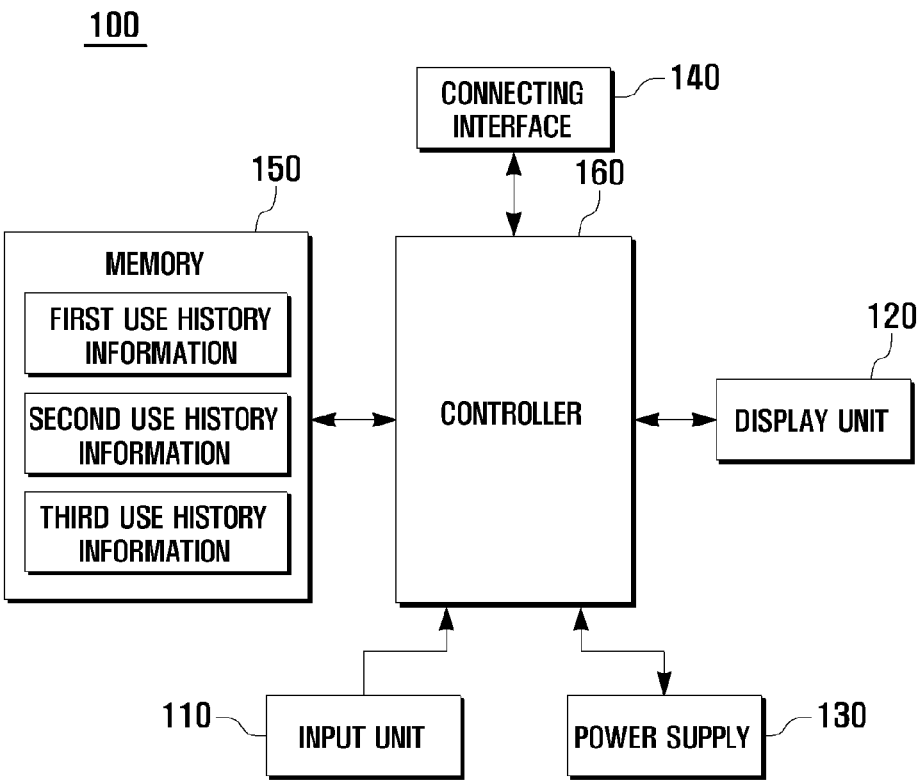
FIG. 2 is a schematic block diagram illustrating a host electronic device according to exemplary embodiments of the present invention.

FIG. 2 is a schematic block diagram illustrating the host electronic device 100 according to an embodiment of the present invention.

Referring to FIG. 2, the host electronic device 100 may include an input unit 110, a display unit 120, a power supply 130, a connecting interface 140, a memory 150, and a controller 160. Although the host electronic device 100 may include the components described above, it should be understood that other components may be included. For example, the host electronic device 100 can further include an audio processing unit for processing audio signals, a camera, a broadcast receiving module, and/or a GPS.

The input unit 110 may include a plurality of input keys and function keys that may provide numerical or letter information input by a user and may set a variety of functions. The function keys may include direction keys, side keys, and/or shortcut keys, which may perform specific functions. The input unit 110 may generate key signals related to user setting and function controls of the host electronic device. The input unit 110 may transmit the key signals to the controller 160. If the host electronic device 100 is manufactured with a full screen-based touch screen, the input unit 110 may be touch screen. The input unit 110 may generate a variety of input signals, according to the user's click or touch and drag action, and may transmit the input signals to the controller 160. Examples of the input signals include, but are not limited to, a signal for requesting file storage states of the plurality of client electronic devices 200, 300, and 400, a signal for moving, copying, or deleting files between the client electronic devices 200, 300, and 400, and a signal for reproducing a specific file contained in the lists of files stored in the respective client electronic devices 200, 300, and 400.

The display unit 120 may display various menus, information input by a user, and information provided to the user. The display unit 120 can also display a variety of screens including, for example, a standby screen, a menu screen, a file management screen, a battery management screen, or file selection and reproduction screens.

In some cases, the display unit 120 may be implemented as a touch screen, so that the display unit 120 may also serve as an input device. The display unit 120 can display file storage states in a geometric diagram, such as a two- or three-dimensional diagram, according to an input signal of the input unit 110. The display unit 120 can also display current operations, such as moving, copying, and/or deleting of files, based on the file storage states in the client electronic devices 200, 300, and 400. The display unit 120 can display remaining battery capacity states of the client electronic devices 200, 300, and 400. The display unit 120 can also display the recharge order of priority for batteries of the client electronic devices 200, 300, and 400, according to the user's setting or a preset selection/preference. The battery recharge order of priority can be altered according to an input signal of the input unit 110. If the battery recharge order of priority is altered, the display unit 120 can display a corresponding state to confirm the alteration. The screen interfaces displayed on the display unit 120 are described in further detail below with reference to FIG. 3, FIG. 4, FIG. 5, FIG. 6, and FIG. 7.

The power supply 130 may supply electric power to the host electronic device 100. The power supply 130 may be implemented using a rechargeable battery that supports mobility of the host electronic device 100. The power supply 130 may have a cord that can be connected to a plug receptacle, thereby providing stable electric power to recharge the client electronic devices 200, 300, and 400 connected to the host electronic device 100. The host electronic device 100 may also have an electric power interface that can be connected to a primary battery to supply emergency power to the host electronic device 100. If the plurality of client electronic devices 200, 300, and 400 are connected to the power supply 130, the power supply 130 may recharge the batteries of the client electronic devices according to the order of priority controlled by the controller 160. The power supply 130 may supply electric power for operating the host electronic device, and does not recharge the batteries of the client electronic devices 200, 300, and 400.

The connecting interface 140 may be implemented using a variety of interfaces that can be connected to the plurality of client electronic devices 200, 300, and 400. As described above, the connecting interface 140 may be connected to the plurality of client electronic devices 200, 300, and 400 using, for example, a USB cable interface, a UART cable interface, and/or a short-range wireless communication module. The connecting interface 140 can also include communication modules that can be connected to an Internet server. For example, the connecting interface 140 can connect to an Internet server using for example, a LAN port and/or a wireless LAN card.

The memory 150 can semi-permanently or temporarily store programs required to operate the host electronic device 100. The memory 150 may also store drivers to control the plurality of client electronic devices 200, 300, and 400, and application programs to check properties of files stored in the client electronic devices 200, 300, and 400, such as extension of files. When the host electronic device 100 transmits and receives data to and from the client electronic devices 200, 300, and 400, the memory 150 may buffer the data in predetermined sizes. The memory 150 may include a program area and a data area.

The program area may store an operating system (OS) for booting the host electronic device 100, and drivers for controlling connection and operation of the plurality of client electronic devices 200, 300, and 400. The program area can also store a variety of application programs. Examples of the application programs include, but are not limited to, file reproducing programs related to music, movies, documents, games, and/or photographs. The program area can also store a program for storing and managing files, a program for managing remaining battery capacity, and a program for selecting and reproducing a file list. The host electronic device 100 may execute the functions using corresponding application programs controlled by the controller 160 if and when requested by the user.

The data area may store data generated by the host electronic device 100 and the client electronic devices 200, 300, and 400. The data area can store information regarding file storage states, remaining battery capacity states, and/or file lists transmitted from the client electronic devices 200, 300, and 400. The data area can store history information related to a reproduced file, a reproduced time, and a reproducing client electronic device. For example, the data area may generate first, second, and third use history information regarding the first, second and third client electronic device, respectively, and may store and update the history information according to the control of the controller 160.

The controller 160 may control the signal flow between all the elements in the host electronic device 100, and may generate control signals for controlling operations of the client electronic devices 200, 300, and 400. The controller 160 may manage file storage states, remaining battery capacity, and file reproduction in the client electronic devices 200, 300, and 400.

In order to manage file storage states, if a particular client electronic device is connected to the host electronic device 100, the controller 160 may request information regarding a file storage state from the connected client electronic device.

After receiving the file storage state information, the controller 160 may instruct the memory 150 to store the file storage state information temporarily. The controller 160 may repeat the process with respect to other client electronic devices and may collect information regarding file storage states of the respective client electronic devices. After that, the controller 160 may map the file storage state information to two- or three-dimensional geometric diagrams and outputs the diagrams, as shall be explained in further detail below with reference to FIG. 3, FIG. 4, and FIG. 5.

Next, the controller 160 may move or copy files from one client electronic device to another client electronic device in response to a touch event. The controller 160 may also delete the files in the client electronic device according to the user's request. To show the file that is being moved or copied, the controller 160 can output detailed information regarding the file that is being moved or copied. The controller 160 can also perform a control operation to display states that indicate where all or some of the files are being stored (e.g., in which client electronic devices the files are stored), based on the information regarding file storage states. Using this function, the controller 160 may manage current states of files stored in the client electronic devices 200, 300, and 400. For example, based on the file storage states, the controller 160 may move and/or copy files, and/or may delete unnecessary files.

To manage remaining battery capacity, if the plurality of client electronic devices 200, 300, and 400 are connected to the host electronic device 100 via the connecting interface 140, the controller 160 may request information regarding remaining battery capacities from the client electronic devices 200, 300, and 400. The controller 160 may compare pieces of information regarding remaining battery capacities from each of the client electronic devices 200, 300, and 400, and may subsequently determine the recharge order of priority with respect to the client electronic devices 200, 300, and 400.

For example, if first, second, and third client electronic devices have remaining battery capacities of $3/4$, $1/2$, and $1/4$, with respect to full battery capacities, respectively, the controller 160 may perform a control operation so that electric power can first be supplied to recharge the battery of the third client electronic device, followed by the second client electronic device, and subsequently the first client electronic device.

In some cases, the controller 160 can also perform a control operation so that the batteries of the client electronic devices can be recharged according to a preset order of priority, irrespective of the information regarding remaining battery capacities of the client electronic devices. For example, if the first, second, and third client electronic devices have first, second, and third orders of priority, respectively, the battery of the first client electronic device is first recharged. After completely recharging the battery of the first client electronic device, the battery of the second client electronic device is then recharged, followed by the battery of the third client electronic device.

Additionally, the controller may recharge batteries according to information regarding remaining battery capacities, the order of priority, or any other preset conditions. For example, if the remaining battery capacity of the first and second client electronic devices is greater than $1/2$ the total battery capacity, the controller 160 may be set not to perform the battery recharging of the first and second client electronic devices. For example, the controller 160 can control the power supply 130 and may not perform a battery recharging operation in the first and second client electronic devices since their remaining battery capacities are greater than ½, even though they may have the relatively higher recharge order of priority. The controller 160 may, however, recharge the battery of the third client electronic device since the battery capacity of the third electronic device may be less than ½ the total battery capacity. The controller 160 can also instruct the display unit 120 to display information regarding the remaining battery capacities and information regarding battery charge states.

In order to manage file reproduction, if the plurality of client electronic devices 200, 300, and 400 are connected to the host electronic device 100 via the connecting interface 140, the controller 160 may request file lists from each of the of client electronic devices 200, 300, and 400. When the controller 160 receives the file lists, the controller 160 instructs the display unit 120 to display the file lists. The controller 160 can also display icons corresponding to the client electronic devices and their respective lists of files. The controller 160 may then ascertain a selected file from the file list according to an input signal from the input unit 110 or a touch screen.

If one or more file to be reproduced or displayed is selected, the controller 160 may check the remaining battery capacity of a corresponding client electronic device storing the selected files. If the remaining battery capacity of the client electronic device is less than a preset level, the controller 160 may check whether the selected file is stored in any other client electronic devices. If the controller 160 ascertains that another client electronic device has also stored the selected file and the other client electronic device's remaining battery capacity is greater than a preset level, the controller 160 can instruct the other client electronic device to reproduce the selected file. If, however, the controller 160 ascertains that the other client electronic device has stored the selected file but also has a remaining battery capacity that is less than the preset level, the controller may then not reproduce the selected file. Accordingly, a pop-up message may be displayed indicating that 'remaining battery capacity is low' on the display unit. In some cases, the pop-up message may be output by a sound (e.g., an alarm).

If the controller 160 does not search for a corresponding file from the plurality of client electronic devices connected to the connecting interface 140, the controller 160 can access an Internet server and download the file from the Internet server. To this end, the host electronic device 100 may include an RF communication unit that can access the Internet server. If the host electronic device 100 does not include an RF communication unit, the controller 160 can determine whether a client electronic device connected to the connecting interface 140 can access the Internet server. For example, if the controller 160 ascertains that the first client electronic device a communication module to access an Internet server, the controller 160 may use the communication module to access the Internet server, and may then perform a control operation so that web pages from the Internet server can be displayed on the display unit 120.

The controller 160 may transmit, via the communication module of the first client electronic device, a message request download of a particular file published on the web pages, according to a user's request. The request may be transmitted to the Internet server via the communication module of the first client electronic device. If the request is granted, the controller may then download the file from the Internet server. The downloaded file may be temporally stored in the first client electronic device, and then reproduced. The downloaded file can also be reproduced by a client electronic device whose remaining battery capacity is sufficient or by a particular client electronic device designated by the user. The controller 160 may store the downloaded file in the first client electronic device or a memory of a user-selected client electronic device. The controller 160 may also store the downloaded file in a client electronic device with the largest remaining battery capacity.

As described above, the host electronic device 100 can integrally and intuitively manage file storage, remaining battery capacity, and file reproduction in a variety of client electronic devices connected to the connecting interface. Hereinafter, the screen interface displayed on the display unit 120 of the host electronic device 100 is explained in detail with reference to FIG. 3, FIG. 4, and FIG. 5.

Figure 3:
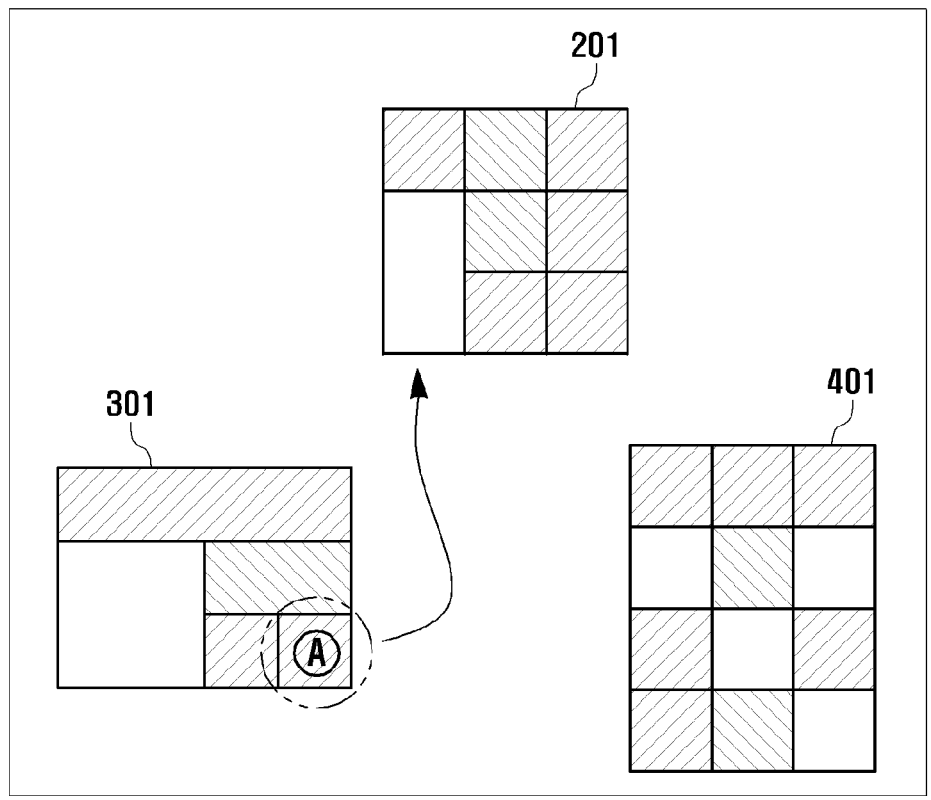
FIG. 3 is a view illustrating a state where a file is stored in each electronic device, displayed on the display unit thereof, according to exemplary embodiments of the present invention.
Figure 4:
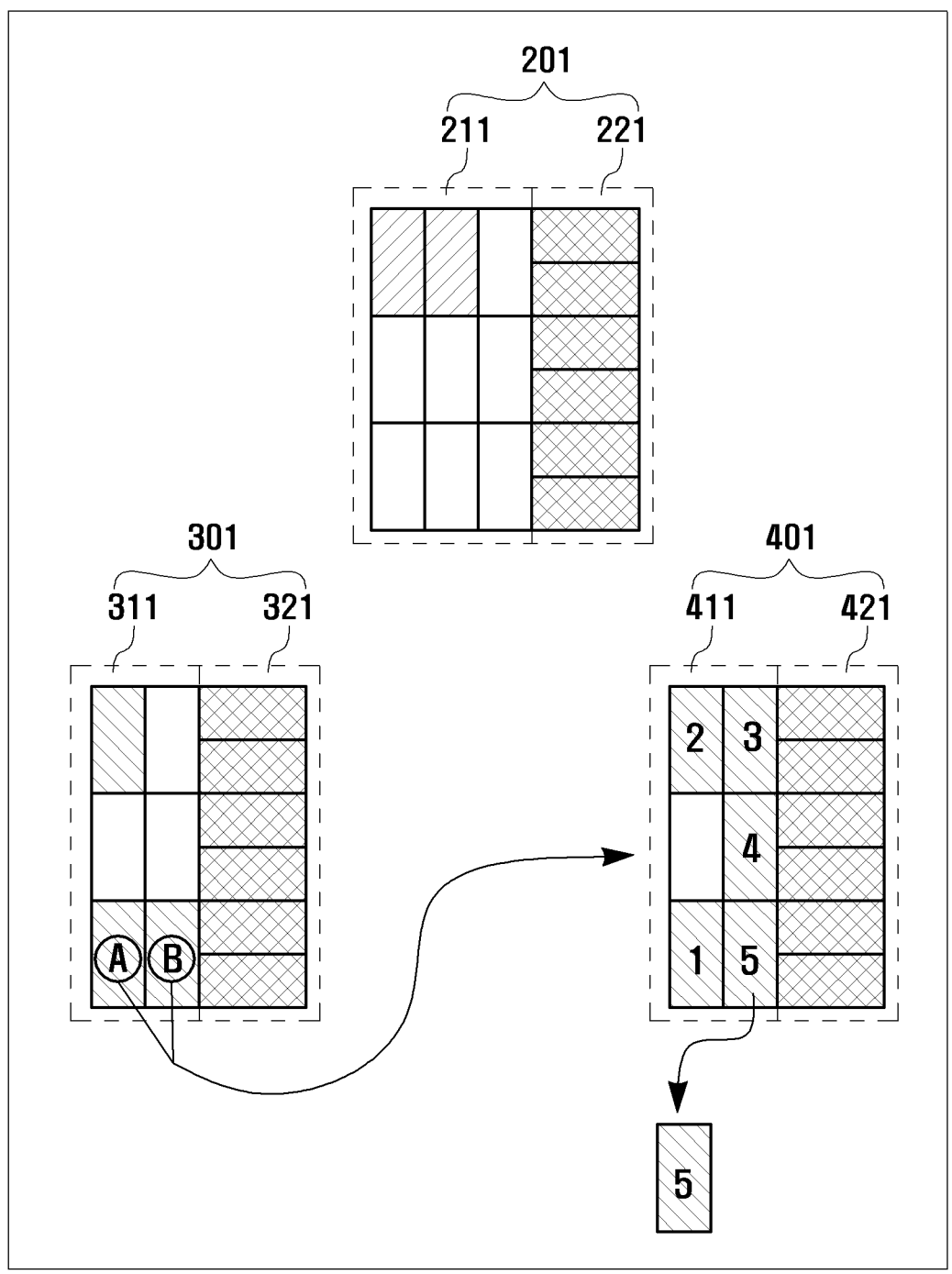
FIG. 4 is a view illustrating a state where a file is stored in each electronic device, displayed on the display unit thereof, according to exemplary embodiments of the present invention.
Figure 5:
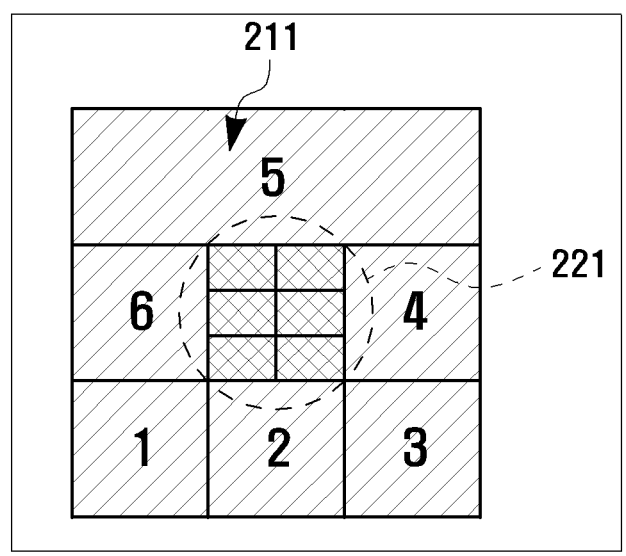
FIG. 5 is a view illustrating a state where a file is stored in each electronic device, displayed on the display unit thereof, according to exemplary embodiments of the present invention.

FIG. 3, FIG. 4, and FIG. 5 show examples of a screen interface for file storage management according to exemplary embodiments of the present invention.

FIG. 3 is a view illustrating a screen interface that displays information regarding file storage states according to exemplary embodiments of the present invention. The file storage states may be received from a plurality of client electronic devices. The screen interface for file storage management can be explained using a two-dimensional block as shown in FIG. 3, FIG. 4, and FIG. 5. It should be appreciated that the file storage management states can be illustrated in various ways, including a three-dimensional geometrical diagram and/or a two-dimensional geometrical diagram.

Referring to FIG. 3, the display unit 120 may display, using a two-dimensional geometrical diagram, file storage states 201, 301, and 401 of the memories in the first, second and third client electronic devices, respectively. The memory in the first client electronic device may be represented by file storage state 201, and may be divided into seven small-size sections and one medium-size section. In some cases, the seven small-size sections may store files, i.e., data, and the medium-size section may be empty. The memory in the second client electronic device may be represented by file storage state 301, and may be divided into two small-size sections, one medium-size section, and two different-shaped large-size sections. In some cases, the two small-size sections, one medium-size section, and one large-size section may store data, and the other large-size section may remain empty. The memory in the third client electronic device may be represented by file storage state 401, and may be divided into 12 small-size sections. Eight of the 12 small-size sections may store data. Each of the file storage states 201, 301, and 401 of the first, second and third client electronic devices may have sections correlated to the file size. For example, in file storage state 401 of the third client electronic device, three small-size sections in the first row (i.e., top row) may store small-size files. With respect to the file storage state 301 of the second client electronic device, the one large-size section in the first row may store one large file. Although the size of files stored in the memory may be divided into small, medium, and large, it should be understood that the file size can further be sub-divided and, accordingly, the file storage state may be divided in various ways.

As described above, while the file storage states of the client electronic devices are displayed on the display unit 120, the controller 160 can alter the file storage states according to a signal input to the input unit. That is, if a touch event occurs on the display unit, with respect to the file storage state 401 of the third client electronic device, the controller 160 can alter the locations of the files according to the input touch event. For example, when a drag event occurs to move the small-size section located in the middle of the second row in file storage state 401 to the empty section located in the middle of the third row, the controller 160 may perform a control operation to move the small-size section to the empty small-size section in the third row. In the file storage state 401 of the client electronic device, the three small-size sections in the second row may then be empty. Accordingly, as explained, the controller 160 can perform a control operation to move selected data to an empty space according to a touch event, and can instruct the display unit 120 to display the move, thereby intuitively and properly performing file management.

If a touch event corresponds to selection of a section "A" in the memory of file storage state 301 of the second client electronic device, and subsequent touch events correspond to dragging and moving the data to the medium-size section in the memory of file storage state 201 of the first client electronic device, the controller 160 may instruct the memory of the second client electronic device to empty stored data in section "A." The controller 160 may also instruct the memory of the first client electronic device to store data previously stored in section "A" in the medium-size section of the memory of file storage state 201. The stored data may be moved by blocks. While moving data blocks, the controller 160 may output movement states of data blocks on the display unit 120 to display data movement from one client electronic device to another.

In some cases, if a specific data block is selected, the controller 160 can instruct the display unit 120 to display detailed information regarding the selected data block on one side of the display unit 120. Detailed information may include, but is not limited to, a file attribute (e.g., a file name), a file size, and/or a file generated date. Accordingly, a user can clearly identify data movement between client electronic devices. In some cases, the controller 160 can instruct the display unit 120 to display all the file attributes of the respective data blocks stored in the memories of the file storage states 201, 301, and 401. The controller 160 can also display data blocks corresponding to files that are correlated, for example, in the same color or in an outline, so that the files can easily be identified. Correlation of files can be changed according to a user's setting. For example, with respect to image files, correlation can be determined according to dates of the image files. With respect to music files, for example, the correlation can be determined according to the singers' names or album titles. The controller 160 can receive information regarding file attributes from the respective client electronic devices to support the file correlation, and can process the files based on the correlation.

In the screen interface for file storage management, data blocks showing the file storage states of the respective client electronic devices can be displayed in different colors to easily distinguish the client electronic devices. For example, the file storage states 201, 301 and 401 of the first, second and third client electronic devices can be displayed in blue, red, and yellow colors, respectively. The respective data blocks can also be displayed in the same color as the respective client electronic devices. If a data block is moved from the memory of one client electronic device to the memory of another client electronic device, the moved data block can, in some cases, retain its initial color (or a color in a previous stage) in the memory of the other client electronic device. Therefore, the user may be able to identify the colors of moved data blocks, and may be able to determine origins of each data block. In some cases, the moved data block may change its color to the color of the data blocks of the client electronic device the data block has been moved to.

After all of the data blocks have been moved and file management has been completed, if a signal for terminating file storage and management job is input, the data blocks stored in the memories of the respective client electronic devices may be unified and displayed, in terms of colors, to match corresponding colors of the client electronic devices. That is, the data blocks keep their original colors while they are moved during the process of file storage movement, so that the user can easily track the movement of data blocks. However, when the file storage management job has been completed, the colors of the data blocks may be unified to match the colors of corresponding client electronic devices, respectively, so that the user can easily perform another file storage management job.

Although memories of the client electronic devices, and sections or data blocks arrayed therein, have been explained in a two-dimensional geometrical diagram, it should be understood that the memories, sections, and data blocks can also be explained in a three-dimensional geometrical diagram. The memories, sections, and data blocks can also be explained using, for example, a circle, a triangle, a sphere, a triangular pyramid, a hexagon, and/or a rhombus. In addition, empty spaces (i.e., not data blocks) in the memory diagrams can also be displayed with the same geometrical diagrams as corresponding data blocks, for example, in a dotted line, a shade, or colors different from those of data blocks, such as a transparent color or a white color. It will be easily appreciated that these geometric diagrams can be configured by a host electronic device engineer or by a user selection. To support the user's selection, the host electronic device 100 can display geometric diagrams according to client electronic devices on a screen of the display unit 120.

FIG. 4 shows a screen interface of a file storage state according to exemplary embodiments of the present invention.

As shown in FIG. 4, each of the memories corresponding to the file storage states 201, 301, and 401 of the first, second and third client electronic devices may be divided into a protection area and a non-protection area. The protection area may refer to an area where files protected from deletion are stored. That is, if a user applies deletion prevention to a file, the file may be stored in the protection area. The non-protection area may refer to an area where general files, not protected from deletion, can be stored.

Referring to the screen interface shown in FIG. 4, the memory corresponding to the file storage state 201 in the first client electronic device may be divided into a first protection area 221 and a first non-protection area 211. The first protection area 221 may be sub-divided into six small-size sections, all of which store data. The first non-protection area 211 may be sub-divided into nine small-size sections, two of which store data and seven of which are in an empty state. The memory corresponding to the file storage state 301 in the second electronic device may be divided into a second protection area 321 and a second non-protection area 311. The second protection area 321 may be sub-divided into six small-size sections, all of which store data. The second non-protection area 311 may be sub-divided into six small-size sections, three of which store data. Two small-size sections store data "A" and "B." The memory corresponding to the file storage state 401 in the third electronic device may be divided into a third protection area 421 and a third non-protection area 411. The third protection area 421 may be sub-divided into six small-size sections, all of which store data. The third non-protection area 411 may be sub-divided into six small-size sections, five of which store data.

As shown in FIG. 4, when data blocks in the sections "A" and "B" stored in the memory 301 of the second client electronic device are intended to be moved to the memory 401 of the third client electronic device, the memory 401 may require additional operations since memory 401 only has one small-size section empty. That is, a file to be moved is stored in two small-sized sections "A" and "B" of the second client electronic device, however, the memory of the third client electronic device has only one small-size section empty. Accordingly, to move data blocks in the sections "A" and "B" to the memory 401 of the third client electronic device, in some cases, the controller 160 may output a pop-up message indicating that all the data blocks cannot be moved. In some cases, the controller 160 may either store the data block corresponding to section "A" or the data block corresponding to "B" in the small-size empty section of the memory 401. The controller 160 may then delete a particular data block stored in the third non-protection area 411, and then store the remaining data block in the empty section of the third non-protection area 411. The controller 160 may perform deletion of data blocks, according to the stored order of files or the use frequency of files. For example, if the third non-protection area 411 stores five data blocks in its sections, respectively, and data block "5" is the oldest one or the lowest use frequency, the controller may delete data block "5" from the section, and then store the moved data block from memory 301, in the empty section of the third non-protection area 411. When a touch event occurs to additionally move other data blocks from the first or second client electronic device to the third client electronic device, the controller may delete data blocks stored in the third client electronic device and then store the data blocks in the empty section of the third client electronic device, as described above. When data block deletion is performed, only the files in the non-protection area are deleted.

A data block copy process can also be performed according to exemplary embodiments of the present invention. A touch event corresponding to an instruction to copy a particular data block may be received and executed by the controller 160. For example, if an input signal is generated by touching the data block in section "A" of the memory 301 twice in order to drag and move the data block in section "A" to an empty small-size section of the memory 401, the controller 160 may retain the data block in section "A" of the memory 301, and store a copy of the data block in section "A" in the small-size section of the memory 401 of the third client electronic device, thereby completing the data block copy process. It should be understood that the touch event for the copying operation may be set in various ways.

FIG. 5 shows a screen interface of a file storage state in the first client electronic device according to exemplary embodiments of the present invention.

Referring to FIG. 5, a file storage state display image corresponding to a memory 201 of the first client electronic device may be configured in such a way that a center portion of the memory 201 is a first protection area 221 and the periphery of the first protection area 221 is a first non-protection area 211. The center portion may include six small-size sections that store data blocks, and the first non-protection area 211 may be situated around the center portion. The first non-protection area 211 may store data blocks. As described above, the process order of priority can be allocated to the data blocks, according to the period of time for storing data blocks or the use frequency of the data blocks. For example, if a data block is intended to be moved or copied from other client electronic devices to the memory of the first client electronic device, the controller 160 may delete the data block stored in section '6,' and subsequently stores the moved or copied data block in the empty section '6.' In addition, if a moved or copied data block is so large that it needs to be stored in a plurality of sections, for example, sections '5' and '6,' the controller 160 may delete data blocks in sections '5' and '6,' and then store the moved or copied data block in the empty sections '5' and '6.' After storing the data blocks, the controller 160 can change, in terms of the order of priority for the stored data blocks, the previous criteria to, for example, a storage time.

As described above, the data blocks stored in a protection area can not be removed and may not be subjected to new data blocks transmitted from other client electronic devices while the new data blocks are being stored. However, the data blocks stored in the protection area can be moved or copied to the other client electronic devices. That is, if a user selects a data block stored in a protection area and moves or copies the selected data block to the other client electronic device, the controller 160, as described above, may store the selected data block in an empty section of the other client electronic device, or, in some cases, may delete one of the data blocks stored in the non-protection area of the other client electronic device and subsequently store the selected block in the empty section. If the data block, moved or copied from the protection area, is set to keep its deletion protection setting, the controller 160 can designate or change the area where the moved or copied data block is placed into a protection area of the other client electronic device. To change the area into a protection area, the controller 160 may transmit a control signal for requesting deletion protection of the data blocks stored in the corresponding client electronic device. If the data block is not set to keep a deletion protection setting, the controller 160 can perform a control operation such that a data block, even though stored in a protection area, may be stored in a non-protection area without a deletion protection setting.

As described above with reference to FIG. 3, the file storage states of the respective client electronic devices shown in FIG. 4 and FIG. 5 can be displayed in colors so that they can be distinguished according to the respective client electronic devices. Furthermore, the data blocks can also be displayed in the same colors as their respective file storage states. For example, during the data block movement process, the data blocks may keep their original colors.

Although the sections of the client electronic devices' memories have been described as having corresponding file sizes, it should be understood that the file sizes in the various client electronic devices may be different. For example, although one or more files may store the same image, the one or more files may differ from each other in terms of size. Therefore, in the following description, it will be appreciated that file sizes corresponding to sections, classified into small-, medium-, and large-sizes, may be normalized within a certain range. Additionally, although the sizes of data blocks, stored in sections corresponding to the file storage states, are explained in such a way as to correspond to the sizes of files, it should be understood that the same-sized data block may correspond to different sized files. Therefore, when data blocks may be moved, for example, from the first client electronic device to the second client electronic device, the host electronic device 100 can determine whether data blocks can be moved based, at least, on the respective sizes of the data blocks.

Figure 6:
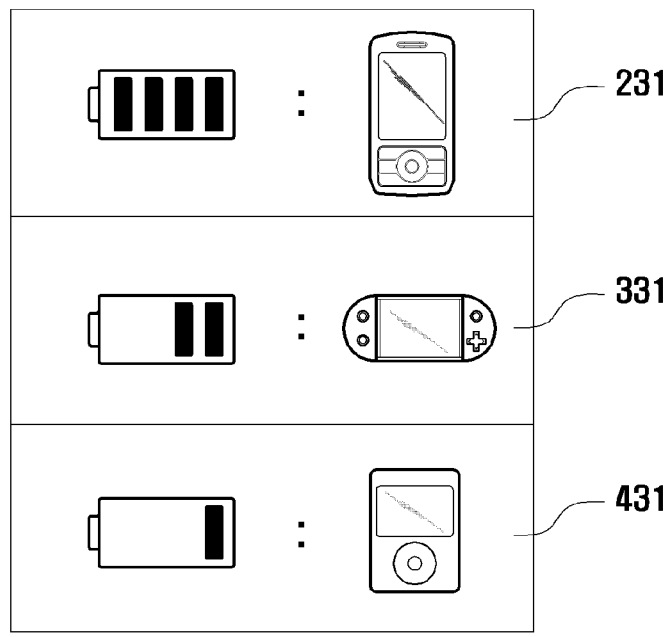
FIG. 6 is a view illustrating states of a remaining battery capacity of each client electronic device, displayed on the display unit, according to exemplary embodiments of the present invention.

FIG. 6 shows a screen interface for managing remaining battery capacity according to exemplary embodiments of the present invention.

Referring to FIG. 6, the display unit 120 of the host electronic device 100 may display images of remaining battery capacities of the first, second, and third client electronic devices in a first row 231, a second row 331, and a third row 431, respectively. When a plurality of client electronic devices are connected to the host electronic device 100 via the connecting interface, the controller 160 of the host electronic device 100 may request information regarding remaining battery capacities of the client electronic devices, and may then displays images corresponding to the received remaining battery capacities on the display unit 120, as shown in FIG. 6. Through images of the remaining battery capacities, the user can easily recognize the energy levels of batteries of the respective client electronic devices. If the client electronic devices receive a request signal for requesting information on remaining battery capacity from the host electronic device 100, the client electronic devices may generate information regarding their remaining battery capacity at the time the request signal is received, and may then transmit the information to the host electronic device.

The display unit 120 can display remaining battery capacities of the respective client electronic devices through an interface, for example, battery icons. The battery icons may show battery levels by a plurality of bars. The number of bars may be correlated to the remaining battery capacity.

Each client electronic device may consume battery power at different rates. For example, client electronic devices, such as an MP3 player and a PSP, may each consume battery power at a different rate. Therefore, a precise estimate of the available operation time of the respective client electronic devices cannot be obtained based on the images of the remaining battery capacity displayed on the display unit 120. Accordingly, when the controller 160 requests information regarding remaining battery capacities from the respective client electronic devices, the controller 160 may also request information regarding the estimated remaining time for operating the respective client electronic devices, as well as the information regarding the remaining battery capacities. The client electronic devices can transmit information including a ratio of remaining battery capacity to the total battery capacity, and information regarding the remaining operating time based on the remaining battery capacities, to the controller 160 of the host electronic device 100. The controller 160 may instruct the display unit 120 to display information regarding the remaining operating time of the respective client electronic devices. Information regarding the remaining operating time may include information based on characteristics of the respective client electronic devices. For example, the PSP electronic device does not require a function for operating a standby screen, since the PSP electronic device is mainly used to reproduce a game or files, etc. Therefore, the remaining battery capacity of the PSP electronic device is proportional to the extra time available to operate the PSP electronic device. However, with respect to a mobile communication electronic device, its extra battery time may differ between a call standby mode and a call mode. Therefore, a mobile communication electronic device may transmit, to the controller 160, time information including information regarding a ratio of the remaining battery capacity of the mobile communication electronic device, information regarding battery available time in a call standby mode, and information regarding battery available time in a call mode. The display unit 120 may also display images of the remaining battery capacities and icons or texts corresponding to the client electronic devices in the same row, respectively, so that the user can easily recognize the remaining battery capacities of the client electronic devices.

After the user has checked the information regarding the respective remaining battery capacities displayed on the display unit 120, the user can directly instruct the controller 160 to recharge a battery of the client electronic device. For example, when the controller 160 receives an input signal from the user for requesting a battery recharge, the controller 160 may instruct the power supply 130 to first recharge the battery of the client electronic device specified by the user according to the input signal. However, if the controller 160 does not receive any specific command from the user, the controller 160 may instruct the display unit 120 to display a pop-up message indicating that battery recharge will be performed according to a preset battery recharge order of priority. The controller 160 may indicate that a battery has been recharged by performing an alarm operation (e.g., sounding an alarm sound).

The controller 160 can also determine the battery recharge order of priority based on stored use history information regarding the client electronic devices. For example, if stored use history information in the memory 150 indicates that a user mainly uses the first client electronic device on Mondays and the second client electronic device on Tuesdays, the controller 160 may determine the current day, and may perform a control operation to first recharge the battery of a client electronic device that is mainly used on the determined current day. During the recharging process, the controller 10 can also control a capacity of a battery to be recharged according to a preset condition, for example, 100% full recharge or 80% of a full recharge. It should be understood that the use history information may include, but not be limited to, time, date, and/or day (e.g., Monday, Wednesday, Friday).

The controller 160 may detect the electric power capacity of the power supply 130 in the host electronic device 100, and may instruct the display unit 120 to display the remaining capacity of the power supply 130. If the power supply 130 is an independent power supply, for example, a battery, the controller 160 can provide information regarding how much the battery of the client electronic devices can be recharged based on the remaining capacity of the power supply 130. Therefore, the controller 160 may detect the remaining battery capacities of the batteries of the client electronic devices, and may generate information regarding how many and how much the batteries of the client electronic devices can be recharged using the remaining capacity of the power supply 130 of the host electronic device 100. The controller 160 may also generate information regarding the battery recharge order of priority of the client electronic devices according to the remaining capacity of the power supply 130, and may provide the generated information to the user.

If the controller 160 detects the remaining battery capacities of the client electronic devices and then determines that all the batteries of the client electronic devices cannot be fully recharged with the remaining capacity of the power supply 130, the controller 160 may perform a battery recharge according to a preset condition. For example, if electric power equivalent to approximately 200 mW is required to recharge the batteries of three client electronic devices, but the remaining capacity of the power supply 130 is 150 mw, the controller 160 may subtract the minimum electric power for operating the host electronic device 100 from the remaining capacity of the power supply 130, and may evenly recharge the three batteries of the three client electronic devices using the subtracted remaining capacity of the power supply 130. If the user inputs a touch event or an input signal to an input unit 110 to designate a particular client electronic device and request a full recharge for the battery of the designated client electronic device, the controller 160 may perform a control operation to first recharge the battery of the designated client electronic device. After completing recharge of the designated client electronic device's battery, the controller 160 may, in some cases, not recharge the remaining client electronic devices. That is, if a user requests a full-recharge for only a particular client electronic device, the controller 160 may perform a recharge the particular client electronic device's battery, and the remaining capacity of the power supply 130 may remain, for example, to make provisions for future recharges.

Figure 7:
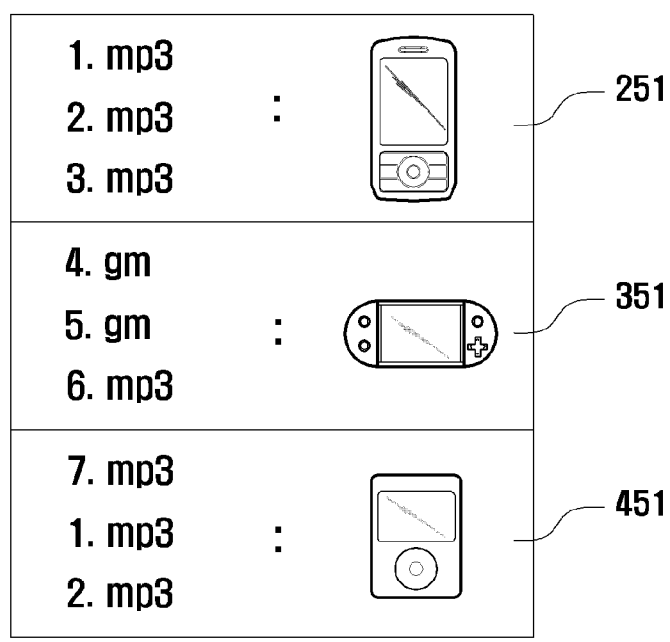
FIG. 7 is a view illustrating a list of files of each client electronic device, displayed on the display unit, according to exemplary embodiments of the present invention.

FIG. 7 shows a screen interface for file reproduction management according to exemplary embodiments of the present invention.

Referring to FIG. 7, the display unit 120 of the host electronic device 100 may display lists of files of first, second and third client electronic devices in a first row 251, a second row 351, and a third row 451, respectively. When a plurality of client electronic devices are connected to the host electronic device 100 via the connecting interface, the controller 160 may request information regarding a list of files from the respective client electronic devices, and may subsequently collect the lists of files from the respective client electronic devices. The collected lists of files may be displayed on the display unit 120 under control of the controller 160.

More specifically, when client electronic devices receive, from the host electronic device 100, a signal requesting information regarding a list of files, the client electronic devices may collect information regarding files stored in their memories, and then transmit the information (i.e., lists of files) to the host electronic device 100. For example, as shown in FIG. 7, the host electronic device 100 may display the names of 3 files (e.g., 1.mp3, 2.mp3, 3.mp3) in a list of files corresponding to the first client electronic device, the names of 3 files (e.g., 4.gm, 5.gm, 6.mp3) in a list of files corresponding to the second client electronic device, and the names of 3 files (e.g., 7.mp3, 1.mp3, 2.mp3) in a list of files corresponding to the third client electronic device. When the lists of files are displayed on the display unit 120, the corresponding client electronic devices shown by, for example, icons or texts, may also be displayed in the same row, respectively.

When the controller 160 receives a signal for selecting a particular file from the input unit 110 or touch screen, the controller 160 may check the remaining battery capacity of the client electronic device that has stored the selected file. If the controller 160 determines that the remaining battery capacity of the client electronic device is sufficient to reproduce the selected file, the controller 160 allows the client electronic device to reproduce the selected file. If the controller 160 determines that the remaining battery capacity of the client electronic device is not sufficient to reproduce the selected file, the controller 160 may perform an alarm operation and check whether the selected file is stored in another client electronic device. When the controller 160 determines that the same (i.e., selected) file is stored in another client electronic device, the controller 160 may determine the remaining battery capacity of the other client electronic device, and may determine whether the same file can be reproduced using the remaining battery capacity. For example, a user may input a signal for reproducing a file (e.g., 1.mp3 in the first row 251), but the remaining battery capacity of the first client electronic device may not be sufficient to reproduce the file. Accordingly, the controller 160 may check whether the file, 1.mp3, is stored in another client electronic device, and may determine that the third client electronic device has also stored the file. After that, if the controller 160 determines the remaining battery capacity of the third client electronic device and that the third client electronic device has sufficient battery capacity to reproduce the file, the controller 160 may instruct the third client electronic device to reproduce the file, 1.mp3. If the controller determines that the remaining battery capacity of the third client electronic device is not sufficient to reproduce the file, 1.mp3, the controller 160 may perform an alarm operation to indicate that the first and third client electronic devices need their batteries recharged.

The controller 160 can also support a file search function. For example, if a user intends to search for a particular file, the controller 160 may display a file searching field on the display unit 120. When the user inputs a word into the file searching field, the controller 160 may determine if any client electronic device has stored the input word. If the controller 160 detects the file requested by the user, the controller 160 may instruct the display unit 120 to display, using an icon or text, the client electronic device having the file. When the searched file is reproduced, the controller 160 may detect the remaining battery capacity, and determine whether the remaining battery capacity is sufficient to reproduce a file, as described above.

If the controller 160 determines that the file requested by the user is not registered in the lists of files of the client electronic devices, the display unit 120 may display a message that the file does not exist in the lists of files. In addition, the controller 160 may instruct the display unit 120 to display a pop-up message inquiring whether the user would like to connect to an Internet server. If the host electronic device 100 has a communication module connectable to the Internet server and the user requests access to the Internet server, the controller 160 may access the Internet sever via the communication module and may search for a file corresponding to the requested file. If the host electronic device 100 does not have a communication module, the controller 160 may check the client electronic devices connected to the connecting interface to determine if a client electronic device can be connected to the Internet server. Subsequently, the controller 160 may access the Internet server via the communication module of the client electronic device.

In the foregoing description, the memory and data blocks have been described using a two-dimensional geometrical diagram, and information regarding remaining battery capacities and lists of files have been illustrated by icons and/or texts, however, it should be understood that exemplary embodiments of the present invention are not limited to the foregoing description. For example, graphic user interface (GUI) objects may be used to display information related to the client electronic devices. For example, client electronic devices may be displayed by a GUI object. The client electronic devices may be displayed in at least one of the same shape, color, position, and/or direction of the GUI object. Accordingly, the host electronic device user can more intuitively manage the memory, battery, and lists of files.

As described above, the system can integrally and efficiently perform file storage management, remaining battery capacity management, and file reproduction management of the client electronic devices. In the following description, methods for managing electronic devices are explained with reference to FIG. 8 and FIG. 9.

Figure 8:
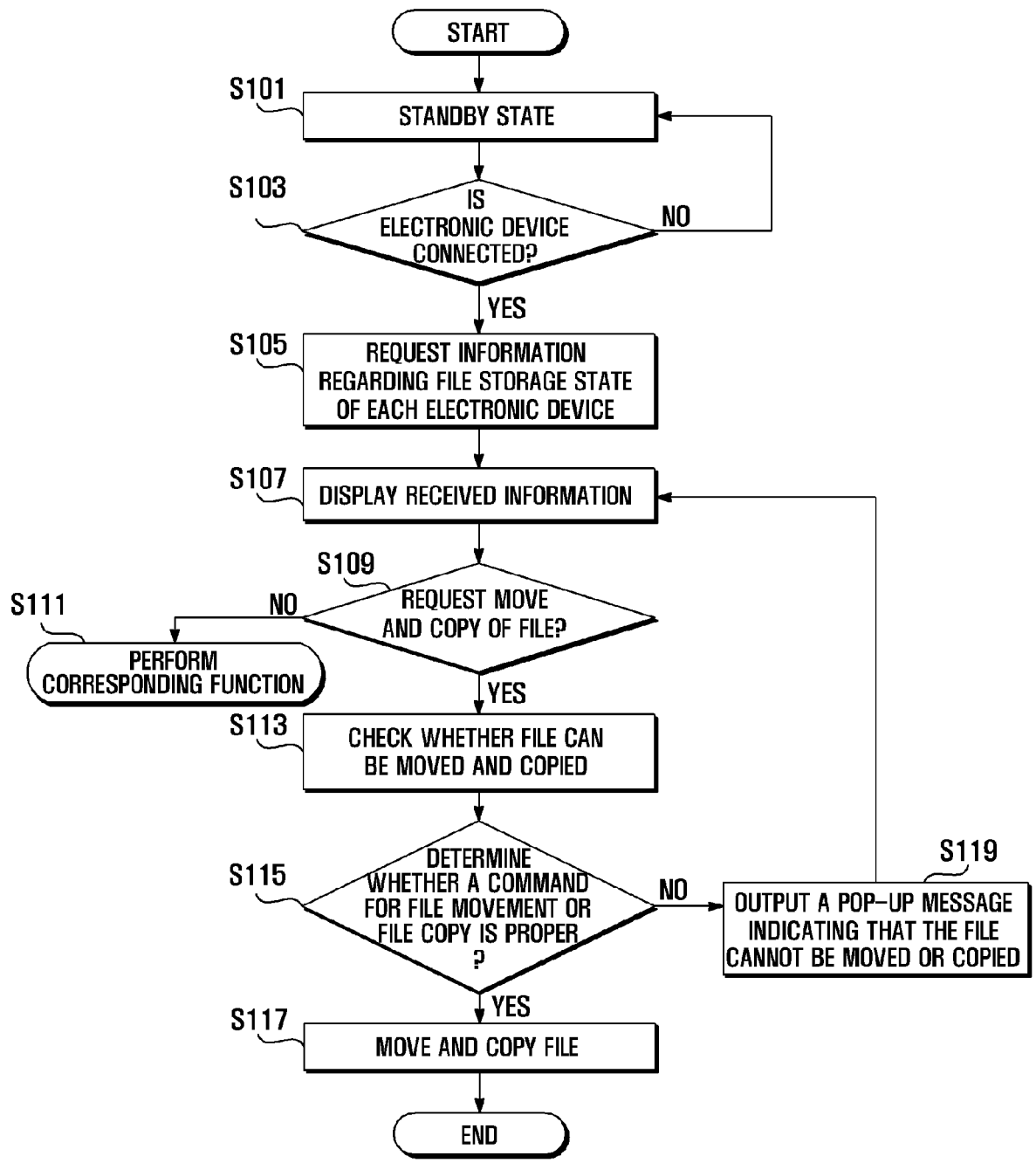
FIG. 8 is a flow chart describing a method for storing and managing files, according to exemplary embodiments of the present invention.

FIG. 8 is a flow chart describing a method for managing file storage states of client electronic devices according to exemplary embodiments of the present invention.

Referring to FIG. 8, the host electronic device 100 may be powered on and booted, and may then operate in a standby state (S101). The host electronic device 100 may check connected states of client electronic devices (i.e., determine if any client electronic device is connected to the host electronic device 100) (S103). That is, the host electronic device 100 may check the connecting interface to determine whether a client electronic device is connected thereto. The connecting interface can be implemented in various ways, as noted above, including, for example, a short-range RF communication module. If the host electronic device 100 determines that a client electronic device is not connected to the connecting interface at step S101, the host electronic device 100 may return to step S101, and may retain the standby state.

If the host electronic device 100 determines that one or more client electronic devices are connected to the connecting interface, the host electronic device 100 may request information regarding file storage states from each of the client electronic devices connected thereto (S105). The host electronic device 100 may have corresponding drivers to control the connected client electronic devices. When the host electronic device 100 receives information regarding file storage states from the client electronic devices, the host electronic device 100 may instruct the display unit 120 to display the received information (S107). The host electronic device 100 may display the information regarding file storage states of the client electronic devices in a two- or three-dimensional geometric diagram, together with detailed information regarding the files stored in the memories of the respective client electronic devices.

The detailed information regarding the stored files may include information related to an origin of electronic device data blocks, generated date, and/or file names. The information regarding file storage state may include the data blocks. If a particular file is selected, the host electronic device 100 can display detailed information regarding the file on the display unit 120. The host electronic device 100 can display the data blocks in a two- or three-dimensional geometrical diagram. Therefore, an empty space in a geometrical diagram corresponding to the memory may be expressed in a geometric diagram shape of a data block. The empty space may be displayed with a dotted outline or with an inner area that is transparent or a whiter color.

Referring back to FIG. 8, next, the host electronic device 100 may determine whether a user requests a file to be moved or copied (S109). The user can request file movement or file copy using the touch screen or the input unit 110. For example, the user may view information regarding file storage states on the display unit 120 and may directly instruct the host electronic device 100 to move or copy a file from one client electronic device to the other though the touch screen or input unit 110. For example the user can generate a touch event for selecting a particular file, and a touch event for dragging the selected file and moving or copying it to the other client electronic device. If the host electronic device 100 determines that the input signal does not correspond to a signal for requesting file movement or file copy, the host electronic device 100 may perform an operation corresponding to the input signal, for example, an operation related to file reproduction management and/or remaining battery capacity management (S111).

If the host electronic device 100 determines that the input signal corresponds to a signal for requesting file movement or file copy, the host electronic device 100 may check a state of the memory of the client electronic device (i.e., specified client electronic device) to which the selected file is to be moved or copied. That is, the host electronic device 100 may determine whether the selected file can be moved or copied to the specified client electronic device (S113). Next, the host electronic device 100 may determine whether a command for file movement or file copy is proper (i.e., whether a storage space to which the selected file is to be moved or copied exists in the client electronic device) (S115). If the host electronic device 100 determines that the selected file cannot be moved or copied to the storage space in the specified client electronic device, host electronic device 100 may output a pop-up message indicating that the file cannot be move or copied (S119), and may then return to step S107.

If the host electronic device 100 determines that the selected file can be moved or copied to the storage space in the specified client electronic device, the host electronic device 100 may move or copy the selected file to the specified client electronic device (S117). For example, if the host electronic device 100 moves or copies a first file from the first client electronic device to the second client electronic device, the host electronic device 100 may check whether the second client electronic device has a space for storing the first file. If the second client electronic device has storage space, the host electronic device 100 may move or copy the first file thereto. That is, the host electronic device 100 may check whether a non-protection area exists in the second client electronic device. If a non-protection area exists in the second client electronic device, the host electronic device 100 can control the second client electronic device to secure an empty space for storing the first file by, for example, deleting at least one file stored in the non-protection area.

The host electronic device 100 can also receive a signal for managing file storage states via the input unit or touch screen. If a variety of files are irregularly stored in the memory of a client electronic device, the host electronic device 100 can perform a control operation to relocate the files in the same memory according to a touch event or input signal.

Figure 9:
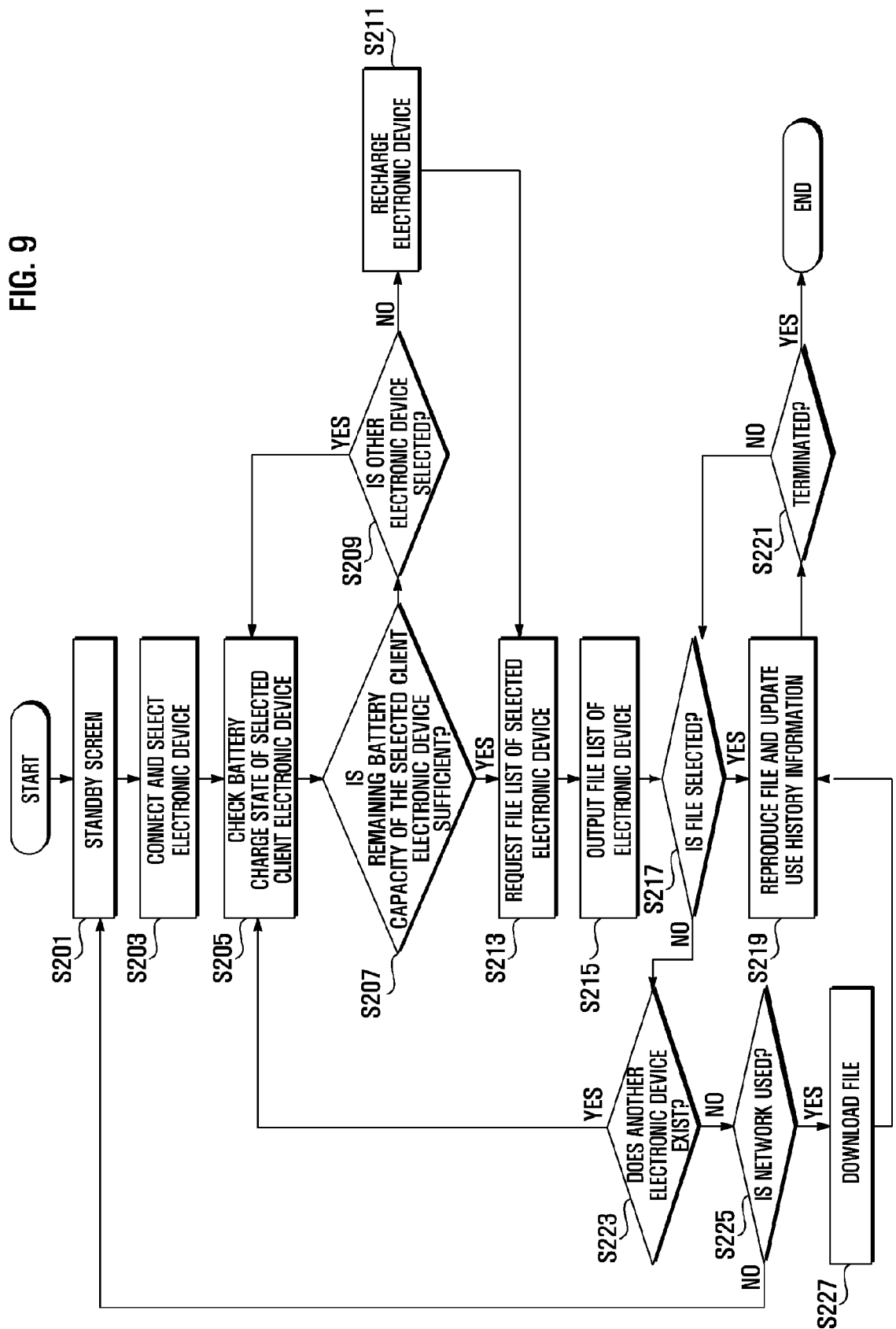
FIG. 9 is a flow chart describing a method for reproducing and managing files according to exemplary embodiments of the present invention.

FIG. 9 is a flow chart describing a method for performing remaining battery capacity management and file reproduction management according to exemplary embodiments of the present invention.

Referring to FIG. 9, the host electronic device 100 may be powered on and booted, and may subsequently operate in a standby state (S201). When client electronic devices are connected to the host electronic device 100, a user may select at least one of the connected client electronic devices (S203). The host electronic device 100 may check a battery charge state of the selected client electronic device (S205). The host electronic device 100 may compare the remaining battery capacity of the selected client electronic device with a preset reference and may determine whether the remaining battery capacity of the selected client electronic device is sufficient (S207). If the host electronic device 100 determines that the remaining battery capacity is not sufficient, the host electronic device 100 may check if the user selected another client electronic device in step S203 (S209). If the user selected another client electronic device, the host electronic device 100 may return to step S205. If the user has not selected another client electronic device, the host electronic device 100 may recharge a battery of the currently selected client electronic device using the power supply 130 (S211).

If, at step S207, the host electronic device 100 determines that the remaining battery capacity of the selected client electronic device is sufficient, the host electronic device 100 may request a list of files from the selected client electronic device (S213). The host electronic device 100 may subsequently output the received list of files (S215).

After outputting the list of files, the host electronic device 100 may determine whether the user has input, using the input unit 110 or the touch screen, a word or a signal to select a particular file in the list of files (S217). If the host electronic device 100 determines that a particular file has been selected or searched by the input word or received signal at S217, the host electronic device 100 may instruct the corresponding client electronic device to reproduce the selected file and to generate or update use history information regarding the selected file according to a reproduction process in the corresponding client electronic device (S219).

The host electronic device may then determine whether a termination signal is input (S221). If a termination signal is not input, the procedure may return to step S217 to make a determination as to whether a word or a signal is input or received to select a particular file. If, however, a termination signal is input, the host electronic device 100 may terminate the procedure.

Referring back to step S217, if the host electronic device 100 determines that a particular file corresponding to the input word or received signal does not exist in the list of files of the client electronic device, the host electronic device 100 may check whether the particular file exists in other client electronic devices (S223).

If the host electronic device 100 determines that the particular file does not exist in other client electronic devices, the host electronic device 100 may query the user to ask whether to use a network (S225). If the host electronic device 100 receives an input signal from the user for using a network, the host electronic device 100 may access an Internet server, search for a corresponding file, and transmit a file request signal to the Internet server. The host electronic device 100 may then download the corresponding file from the Internet server (S227) if the Internet server permits the host electronic device 100 to download the corresponding file. After completing the file download, the host electronic device 100 may return to step S219 where the file may be reproduced and the use history information may be updated.

The updated use history information may be stored, as a file, in each client electronic device having a communication module that can be connected to the Internet server. The host electronic device 100 can also store the downloaded file in a particular client electronic device, according to a preset condition. The host electronic device 100 may then generate a use history with respect to the client electronic device storing the file.

Referring back to step 223, if the host electronic device 100 determines that the file to be selected and reproduced exists in other client electronic devices, the host electronic device 100 may return to step S205. At step S205, the host electronic device 100 may determine whether remaining battery capacity of the other client electronic device is sufficient to reproduce the selected file. If the remaining battery capacity is sufficient, the host electronic device 100 may reproduce the file. However, if the remaining battery capacity is not sufficient, the host electronic device 100 may recharge the battery of the other client electronic device and then reproduce the file. In this process, the host electronic device can skip steps S213, S215, and S217 to reproduce the selected file.

As described above, exemplary embodiments of the present invention disclose an effective and stable electronic device managing method for integrally managing and reproducing files stored in a plurality of client electronic devices, and for checking remaining battery capacities of the client electronic devices. A file storage state, a remaining battery capacity state, and a file reproduction state of at least one electronic device may also be integrally and efficiently managed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An electronic device managing method, the method comprising:
    receiving information regarding file storage states from a plurality of client electronic devices connected to a host electronic device, some of the file storage states corresponding to stored data and some of the file storage states corresponding to empty storage space;
    displaying, on a display unit of the host electronic device, the received information as a plurality of graphic user interface objects corresponding to the received information;
    wherein displaying the received information comprises displaying, on the display unit, geometric diagrams comprising a plurality of sections corresponding to the information regarding the file storage states received from the plurality of client electronic devices, and displaying, on the display unit, a file geometric diagram corresponding to a file stored in one of the plurality of client electronic devices;
    wherein sizes of the plurality of sections are determined according to respective sizes of files corresponding to stored data and sizes of empty storage space identified based on the received information;
    receiving, via an input unit or touch screen of the host electronic device, an input signal for selecting the file geometric diagram; and
    moving or copying the file geometric diagram to an empty geometric diagram corresponding to a memory space in other memory spaces of another client electronic device connected to the host electronic device, a memory space corresponding to the file geometric diagram having the same or smaller size than the memory space corresponding to the empty geometric diagram.

2. The method of claim 1, wherein:
    the graphic user interface objects are associated with a shape, color, position, and/or direction; and
    displaying the received information comprises displaying graphical representations corresponding to the respective client electronic devices in at least one of the shape, color, position, and/or direction associated with the graphic user interface object.

3. The method of claim 1, wherein the geometric diagrams are a two- or three-dimensional geometric diagram.

4. The method of claim 1, further comprising:
    receiving a movement input signal for moving the file geometric diagram to another geometric diagram corresponding to a memory space in other memory spaces of another client electronic device connected to the host electronic device, the memory space in the other memory spaces of the another client electronic device having a same or larger size as a memory space corresponding to the file geometric diagram; and moving, if the file geometric diagram cannot be moved to the other geometric diagram, the file geometric diagram to an empty geometric diagram corresponding to a memory space in a client electronic device having a same or larger size as the memory space corresponding to the file geometrical diagram.

5. The method of claim 1, further comprising:

deleting, if a memory of the other client electronic device does not have sufficient space to store the file geometric diagram, a geometric diagram corresponding to at least one file stored in the memory of the other client electronic device, according to a set condition; and placing the file geometric diagram in a memory space corresponding to the deleted geometric diagram.

6. The method of claim 5, wherein deleting a geometric diagram further comprises at least one of the following steps of:

selecting and deleting an oldest geometric diagram of geometric diagrams corresponding to files stored in other memory spaces; and selecting and deleting a geometric diagram having a lowest use frequency of geometric diagrams corresponding to files stored in other memory spaces.

7. The method of claim 5, wherein deleting a geometric diagram further comprises:

determining whether other memory spaces comprise a protection area from which files cannot be deleted and a non-protection area from which files can be deleted; and deleting, if other memory spaces comprise the non-protection area, at least one geometrical diagram corresponding to at least one file stored in the non-protection area.

8. The method of claim 1, further comprising:

displaying detailed information regarding a selected geometric diagram; or displaying detailed information regarding all geometric diagrams stored in the respective client electronic device and/or other client device connected to the host electronic device.

9. The method of claim 1, wherein displaying the received information comprises displaying, on the display unit, geometric diagrams corresponding to the one of the plurality of client electronic devices in a color and other geometric diagrams corresponding to the another client electronic device connected to the host electronic device in another color different than the color.

10. The method of claim 9, wherein the file corresponds to the file geometric diagram having the color, and wherein the file geometric diagram retains the color while moving to the memory of the another client electronic device; and changing, after moving the file geometric diagram, the color of the file geometric diagram to the other color associated with geometric diagrams of the another client electronic device.

11. A host electronic device, comprising:

a connecting interface configured to receive information regarding file storage states from a plurality of client electronic devices connected to the connecting interface;

a display unit configured to display the received information as a graphic user interface object corresponding to a file stored in the memory spaces;

an input unit configured to generate at least one of a first input signal to select a file geometric diagram, and a second input signal to move the selected file geometric diagram to another geometric diagram corresponding to a copy memory space having a same or larger size than a size of a file memory space corresponding to the selected file geometric diagram; and a controller configured to:

control reception and display of the received information and to cause display of geometric diagrams comprising a plurality of sections corresponding to the information regarding the file storage states of the plurality of client electronic devices on the display unit, some of the file storage states corresponding to stored data and some of the file storage states corresponding to empty storage space;

move the selected file geometric diagram to an empty geometric diagram corresponding to the copy memory space, or to copy the selected file geometric diagram to an empty geometric diagram corresponding to the copy memory space, the file memory space being situated in a client electronic device of the client electronic devices, and the copy memory space being situated in another client electronic device of the client electronic devices; and delete at least one geometric diagram corresponding to at least one file stored in the memory of the other client electronic device, according to a set condition, and the controller is configured to place the selected file geometric diagram in a memory space corresponding to the deleted geometric diagram, wherein sizes of the plurality of sections are determined according to respective sizes of files corresponding to stored data and sizes of empty storage space identified based on the received information.

12. The host electronic device of claim 11, wherein the graphic user interface object is associated with a shape, color, position, and/or direction, and wherein the display unit is configured to display the received information by, at least, displaying a graphical representation corresponding to the client electronic devices in at least one of the same shape, color, position, and/or direction associated with the graphic user interface object.

13. The host electronic device of claim 11, wherein the geometric diagrams comprise a geometric diagram corresponding to the information regarding file storage state transmitted from the client electronic devices.

14. The host electronic device of claim 13, wherein the geometric diagram is a two- or three-dimensional geometric diagram.

15. The host electronic device of claim 13, wherein, the information regarding file storage states is received from the client electronic devices, the display unit being configured to display detailed information regarding a selected geometric diagram, or detailed information regarding all geometric diagrams stored in the client electronic devices.

16. The host electronic device of claim 15, wherein the display unit is configured to display the geometric diagrams corresponding to the client electronic device of the client electronic devices in a color and other geometric diagrams corresponding to the another client electronic device of the client electronic devices in another color different than the color.

17. The host electronic device of claim 15, wherein, if a file is moved from a memory of the client electronic device to a memory of the another client electronic device, the controller is configured to retain the color of moved geometric diagrams corresponding to the move file, and, after completing the move of the moved geometric diagrams, to change the color of the moved geometric diagrams to another color, according to a color setting input signal.

18. The host electronic device of claim 11, wherein the controller is configured to select and delete an oldest geometric diagram of the geometric diagrams corresponding to files stored in the memory spaces of the another client electronic device, or a geometric diagram having a lowest use frequency of geometric diagrams corresponding to files stored in the memory space of the another client electronic device.

19. The host electronic device of claim 11, wherein, the memory of the another client electronic device comprises a protection area from which files cannot be deleted and a non-protection area from which files can be deleted, the controller being configured to delete the at least one geometric diagram corresponding to at least one file stored in the non-protection area.

* * * * *